(12) United States Patent
Sutman et al.

(10) Patent No.: US 8,163,134 B2
(45) Date of Patent: Apr. 24, 2012

(54) COPOLYMER BLEND COMPOSITIONS FOR USE TO INCREASE PAPER FILLER CONTENT

(75) Inventors: Frank J. Sutman, Wilmington, DE (US); Joseph M. Mahoney, Newark, DE (US); Robert Anthony Gill, Bethlehem, PA (US); Daniel Bruce Evans, Bethlehem, PA (US)

(73) Assignees: Hercules Incorporated, Wilmington, DE (US); Specialty Minerals (Michigan) Inc., Bingham Farms, MI (US)

( * ) Notice: Subject to any disclaimer, the term of this patent is extended or adjusted under 35 U.S.C. 154(b) by 315 days.

(21) Appl. No.: 12/562,446

(22) Filed: Sep. 18, 2009

(65) Prior Publication Data

US 2010/0071863 A1    Mar. 25, 2010

Related U.S. Application Data

(60) Provisional application No. 61/192,891, filed on Sep. 22, 2008.

(51) Int. Cl.
*D21H 17/34* (2006.01)
*D21H 17/67* (2006.01)
*D21H 17/69* (2006.01)

(52) U.S. Cl. ............... 162/168.1; 162/168.2; 162/168.3; 162/181.1; 162/181.2; 162/183

(58) Field of Classification Search .... 162/164.1–164.7, 162/168.1–168.7, 181.1–181.8, 183; 106/401, 106/464; 523/333, 334; 524/425, 788
See application file for complete search history.

(56) References Cited

U.S. PATENT DOCUMENTS

| | | | |
|---|---|---|---|
| 4,925,530 A | 5/1990 | Sinclair et al. | |
| 4,943,349 A | 7/1990 | Gomez | |
| 5,076,846 A * | 12/1991 | Buri et al. | 106/401 |
| 5,176,797 A | 1/1993 | Hartan et al. | |
| 5,232,881 A | 8/1993 | Wu | |
| 5,244,542 A | 9/1993 | Bown et al. | |
| 5,317,053 A * | 5/1994 | Brown et al. | 524/425 |
| 5,326,381 A | 7/1994 | Wu | |
| 5,344,487 A | 9/1994 | Whalen-Shaw | |
| 5,449,402 A * | 9/1995 | Whalen-Shaw | 106/416 |
| 5,492,560 A | 2/1996 | Fairchild | |
| 5,653,795 A * | 8/1997 | Brown | 106/469 |
| 5,672,249 A | 9/1997 | Vinson et al. | |
| 5,676,746 A | 10/1997 | Brown | |
| 5,676,747 A * | 10/1997 | Brown | 106/465 |
| 5,700,352 A | 12/1997 | Vinson et al. | |
| 5,755,930 A * | 5/1998 | Satterfield et al. | 162/164.1 |
| 5,827,398 A | 10/1998 | Depasquale et al. | |
| 6,033,524 A | 3/2000 | Pruszynski et al. | |
| 2005/0197278 A1 | 9/2005 | Esser et al. | |
| 2006/0142429 A1* | 6/2006 | Gelman et al. | 524/13 |
| 2006/0142430 A1* | 6/2006 | Harrington et al. | 524/13 |
| 2007/0208143 A1 | 9/2007 | Kimura et al. | |

FOREIGN PATENT DOCUMENTS

| | | |
|---|---|---|
| EP | 0281134 B1 | 9/1988 |
| EP | 0401790 B1 | 12/1990 |
| EP | 1282741 B1 | 2/2003 |
| EP | 1613703 B1 | 1/2006 |

* cited by examiner

*Primary Examiner* — Eric Hug
*Assistant Examiner* — Peter Chin
(74) *Attorney, Agent, or Firm* — Connolly Bove Lodge & Hutz LLP

(57) ABSTRACT

Methods for making a heterogeneous polymer blend comprising one or more anionic polymers, one or more cationic polymers, and one or more non-ionic polymers, which method comprises (a) adding to a non-neutral solution a first amount of polymerization initiator and one or more anionic or cationic monomers, wherein each monomer has the same charge; (b) adding a second amount of the polymerization initiator and one or more non-ionic monomers; (c) adding a third amount of the polymerization initiator and one or more ionic monomers that are oppositely charged from the monomers of (a); adding stepwise, a fourth amount of the polymerization initiator to react any residual monomer, and (e) neutralizing the resulting polymer blend. Also claimed are heterogeneous polymer blends containing polymers formed from one or more anionic, cationic, and non-ionic monomers, either polymerized in situ or separately and then combined. Also claimed are methods for increasing the filler content of paper or paperboard, which methods comprises (a) combining the heterogeneous polymer blend with a precipitated calcium carbonate filler; (b) combining the resulting mixture with a pulp slurry; and (c) processing the resulting slurry mixture to form a sheet of paper or paperboard. Finally, also claimed are methods of increasing the filler content of paper or paperboard, which method comprises (1) combining either the heterogeneous blend or the precipitated calcium carbonate filler with a pulp slurry, (2) combining the remaining component with the pulp slurry; and (c) processing the resulting pulp slurry mixture to form a sheet of paper or paperboard.

15 Claims, No Drawings

COPOLYMER BLEND COMPOSITIONS FOR USE TO INCREASE PAPER FILLER CONTENT

CROSS-REFERENCE TO RELATED APPLICATION

This application claims priority to Provisional Application No. 61/192,891, filed with the United States Patent and Trademark Office on Sep. 22, 2008.

BACKGROUND OF THE INVENTION

In the papermaking industry, substituting inorganic filler for wood fiber in paper and paperboard is advantageous because the inorganic filler is generally less expensive than wood fiber and the substitution lowers costs. Precipitated calcium carbonate is commonly used as a filler in the industry. Although inorganic fillers decrease the total cost of papermaking, increasing concentrations can reduce the overall bulk, strength, and stiffness of the paper—all of which are important end use performance properties.

This decrease in strength and stiffness in the final paper product is a result of the structure of the wood pulp and inorganic filler. During the papermaking process, the long wood pulp fibers become entangled, thus creating a strong web of fiber. The inorganic filler does not have these long fiber chains, so increasing the inorganic filler content can weaken the fiber web in the finished product. In addition, as the inorganic filler content increases, the never-dried strength of the wet web exiting the press section of a paper machine decreases. This strength decrease affects machine runnability and may force the paper machine to run at lower yields because of a lower thru-put or higher downtime because of web breaks in the wet web.

Although the prior art teaches treatments, as part of the papermaking process, for increasing the retention of fine inorganic fillers in the final paper or paperboard product, the prior art does not disclose methods to increase the inorganic filler content of paper while simultaneously maintaining the weight, strength, and runnability of the end product.

For example, dry strength resins are known in the prior art and can increase the strength of the finished paper product when mixed into the initial paper pulp slurry (also called a paper furnish). Amphoteric, water-soluble dry strength resins are known in the prior art. Amphoteric resins are typically made by reacting acrylamide with cationic and anionic monomers (for example, diallyldimethylammonium chloride ("DADMAC") and acrylic acid) in a free radical copolymerization reaction. These resins are generally limited to 10-15 mol % of each ionic component (20-30 mol % charged polymer total). If the ionic polymer concentration is higher, the solution becomes unstable.

Additionally, separate anionic and cationic polymeric dry strength resins are also known in the prior art. Typically, these resins will be added sequentially—i.e. all the resin of one charge is added, then all the resin of the opposite charge is added. When anionic and cationic resins are added as separate resins, the anionic resin is typically an acrylamide/acrylic acid copolymer. The cationic typically contains either DADMAC, acryloylethyltrimethylammonium chloride ("AETAC"), or a hydrolyzed form of vinyformamide.

For example, the inorganic filler content of paper may be increased by treating the pulp slurry and inorganic filler separately with a charged polymer, then treating the filler with an oppositely charged ionic, and mixing the treated filler and pulp slurry together. Alternatively, one may treat only the inorganic filler with a charged polymer, and then combine the treated filler with the pulp slurry for processing into paper.

Another method to maintain paper bulk as the inorganic filler content of paper is increased is to increase the average inorganic filler particle size. An increase in filler concentration and/or filler particle size can lead to additional abrasion on the paper slurry processing surfaces. This abrasiveness generally manifests itself as additional wear on the wet end of the paper making process, especially on the paper forming fabrics and static drainage elements. Additionally, the increased wear on these parts, slitter knives, and other surfaces may degrade the quality of the final paper product and increase maintenance and servicing costs for the equipment. Previous attempts to mitigate these problems have included addition of surfactants and TEFLON (polytetrafluoroethylene) to the paper slurry.

BRIEF SUMMARY OF THE INVENTION

The invention relates, in general, to the surprising discovery that heterogeneous polymer blends that contain polymers composed of at least one anionic, one cationic, and one non-ionic monomer may be used to increase the inorganic filler content of paper without negatively affecting paper strength, weight, or runnability. This discovery allows for the cost-effective production of paper or paperboard. The present invention also relates in one aspect to a novel method of creating the novel heterogeneous polymer blends. Finally, the present invention also relates in another aspect to methods of using the heterogeneous polymer blends with a precipitated calcium carbonate filler to maintain the strength, weight, and runnability of paper or paperboard.

One embodiment of the present invention is a method of making a heterogeneous polymer blend for increasing the inorganic filler content of paper or paperboard, comprising: (a) adding to a non-neutral solution a first amount of polymerization initiator and one or more anionic or cationic monomers, wherein each monomer has the same charge; (b) adding a second amount of the polymerization initiator and one or more non-ionic monomers to the solution; (c) adding a third amount of the polymerization initiator and one or more ionic monomers that are oppositely charged from the monomers of step (a); and (d) adding, stepwise, a fourth amount of the polymerization initiator to react any residual monomer and resulting in the heterogeneous polymer blend, and (e) if necessary, neutralizing the resulting heterogeneous polymer blend, wherein the polymerization initiator is selected from the group consisting of water soluble azo initiators.

The anionic monomer(s) may be: (1) acrylic acid, (2) methacrylic acid, (3) styrenesulfonic acid, (4) vinylsulfonic acid, (5) acrylamidomethylpropane sulfonic acid, or (6) mixtures thereof.

The cationic monomer(s) may be: (1) diallyldimethylammonium chloride, (2) acryloylethyltrimethyl ammonium chloride, (3) methacryloylethyl trimethyl ammonium chloride, (4) acryloylethyltrimethylammonium sulfate, (5) methacryloylethyl trimethyl ammonium sulfate, (6) acrylamidopropyltrimethyl ammonium chloride, (7) methacrylamidopropyl trimethyl ammonium chloride, (8) non-quaternized forms of (2)-(7), (9) vinylformamide (subsequently hydrolyzed to vinylamine), or (10) mixtures thereof.

The nonionic monomer(s) may be: (1) acrylamide, (2) methacrylamide, (3) N-alkylacrylamide, (4) vinylformamide, or (5) mixtures thereof.

Another embodiment of the invention is a heterogeneous polymer blend comprising: (a) one or more anionic polymers formed from monomers selected from the group: (1) acrylic acid, (2) methacrylic acid, (3) styrenesulfonic acid, (4) vinylsulfonic acid, (5) acrylamidomethylpropane sulfonic acid, and (6) mixtures thereof; (b) one or more cationic polymers formed from monomers selected from the group: (1) diallyldimethylammonium chloride, (2) acryloylethyltrimethyl ammonium chloride (3) methacryloylethyl trimethyl ammonium chloride, (4) acryloylethyltrimethylammonium sulfate (5) methacryloylethyl trimethyl ammonium sulfate, (6) aciylamidopropyltrimethyl ammonium chloride, (7) methacrylamidopropyl trimethyl ammonium chloride, (8) non-quaternized forms of (2)-(7), (9) vinylformamide (subsequently hydrolyzed to vinylamine), and (10) mixtures thereof; (c) one or more non-ionic polymers formed from monomers selected from the group: (1) acrylamide, (2) methacrylamide, (3) N-alkylacrylamide, (4) vinylformamide, and (5) mixtures thereof;

The heterogeneous polymer blend may also contain (a) one or more copolymers comprising at least one anionic monomer and at least one non-ionic monomer; (b) one or more copolymers comprising at least one cationic monomer and at least one non-ionic monomer.

The heterogeneous polymer blend may also contain one or more terpolymers comprising at least one anionic monomer, at least one cationic monomer, and at least one non-ionic monomer.

Yet another embodiment of the invention is a method of increasing the filler content of a sheet of paper or paperboard comprising: (a) combining the heterogeneous polymer blend with a precipitated calcium carbonate filler to form a mixture; (b) combining the resulting mixture with a pulp slurry; and (c) processing the resulting pulp slurry mixture to form a sheet of paper or paperboard.

Another embodiment of the invention is a method of increasing the filler content of a sheet of paper or paperboard comprising: (a) combining either the heterogeneous polymer blend or a precipitated calcium carbonate filler with a pulp slurry to form a mixture; (b) combining the remaining component from step (a) with the pulp slurry mixture; and (c) processing the resulting pulp slurry mixture to form a sheet of paper or paperboard.

Another embodiment of the invention is a method of increasing the filler content of a sheet of paper or paperboard comprising: (a) combining a poly-diallyldimethylammonium chloride and acrylamide/acrylate copolymer mixture with a precipitated calcium carbonate filler; (b) combining the resulting mixture with a pulp slurry; and (c) processing the resulting pulp slurry to form a sheet of paper or paperboard.

Yet another embodiment of the invention is a method of increasing the filler content of a sheet of paper or paperboard comprising: (a) combining either a poly-diallyldimethylammonium chloride and acrylamide/acrylate copolymer mixture or a precipitated calcium carbonate filler with a pulp slurry; (b) combining the remaining component from step (a) with the pulp slurry mixture; and (c) processing the resulting pulp slurry mixture to form a sheet of paper or paperboard.

DETAILED DESCRIPTION OF THE INVENTION

As used herein, the singular terms "a" and "the" are synonymous and used interchangeably with "one or more" or "at least one" unless the context clearly indicates a contrary meaning. Accordingly, for example, a reference to "a compound" herein, or in the appended claims, can refer to a single compound or more than one compound. Additionally, all numerical values, unless otherwise specifically noted, are understood to be modified by the word "about." For all the compositions and processes included herein, it should be understood that there will be at least trace amounts of the unreacted constituent components, including any monomers and polymer reaction initiators used. Unless otherwise indicated "weight %" refers to the weight % of the solids in a particular blend and excludes the weight of the water contained in the aqueous solution.

Compositions and processes in accordance with the various embodiments of the present invention are suitable for use to increase the inorganic filler content of paper and paper board. The present invention also increases the runnability of wet web paper furnish. The present invention includes a novel heterogeneous polymer blend of polymers formed from anionic, cationic, and nonionic monomers. The present invention also includes an in-situ method of making the novel heterogeneous polymer blend. Also included in the present invention is a method of increasing the inorganic filler content of paper or paperboard by treating the pulp slurry with the heterogeneous polymer blend and a precipitated calcium carbonate filler. Finally, included in the present invention is a method of increasing the inorganic filler content of paper by treating a pulp slurry with a poly-diallyldimethylammonium chloride and acrylamide/acrylate copolymer mixture and a precipitated calcium carbonate filler.

Stable, aqueous heterogeneous polymer blend compositions can be prepared in-situ via a stepwise reaction method in a non-neutral solution. Prior to, and during, the reaction, the solution is non-neutral to minimize the reaction between the anionic and cationic monomers. The method comprises the steps of (a) polymerizing one or more anionic monomers using a thermal polymerization initiator in a non-neutral solution; (b) adding one or more nonionic monomers and additional thermal polymerization initiator to the solution; (c) adding one or more cationic monomers and additional thermal polymerization initiator to the solution; (d) reacting any residual monomer with additional thermal polymerization initiator; and (e) neutralizing the resulting aqueous heterogeneous polymer blend. The resulting heterogeneous polymer composition contains, at most, nonionic homopolymer, cationic homopolymer, anionic homopolymer, anionic/nonionic copolymer, cationic/nonionic copolymer, and, optionally, anionic/nonionic/cationic terpolymer. It is understood in the art that the above composition will contain trace amounts of both the thermal polymerization initiator and the constituent monomer components.

As illustrated in the Examples set out below, the addition order of the monomer components may be reversed, so that the cationic monomer is reacted first and the anionic monomer is reacted last. Alternatively, heterogeneous polymer blends may be formed by polymerizing the anionic, cationic, and nonionic monomers separately, and then combining the resulting polymers into a blend. Preferably, the heterogeneous polymer blends are created via in-situ reaction.

The polymerization initiator may be any known polymerization initiation technique, including, but not limited to oxidative reduction and thermal polymerization. Preferably, the polymerization initiator is a thermal polymerization initiator. More preferably, the polymerization initiator is a water-soluble azo initiator. Most preferably, the polymerization initiator is azodiisobutyramidine dihydrochloride (V50), available from Wako, Richmond, Va.

The monomers may be any monomers widely used in the papermaking industry. Preferably, the anionic monomer is acrylic acid, methacrylic acid, styrenesulfonic acid, vinylsulfonic acid, or acrylamidomethylpropane sulfonic acid. More preferably, the anionic monomer is acrylic acid.

Preferably, the cationic monomer is diallyldimethylammonium chloride; acryloylethyltrimethyl ammonium chloride; methacryloylethyl trimethyl ammonium chloride; acryloylethyltrimethylammonium sulfate; methacryloylethyl trimethyl ammonium sulfate; acrylamidopropyltrimethyl ammonium chloride; methacrylamidopropyl trimethyl ammonium chloride; the non-quaternized forms of acryloylethyltrimethyl ammonium chloride, methacryloylethyl trimethyl ammonium chloride, acryloylethyltrimethylammonium sulfate, methacryloylethyl trimethyl ammonium sulfate, acrylamidopropyltrimethyl ammonium chloride, methacrylamidopropyl trimethyl ammonium chloride; and vinylformamide (subsequently hydrolyzed to vinylamine). More preferably, the cationic monomer is diallyldimethylammonium chloride.

Preferably, the nonionic monomer is acrylamide, methacrylamide, N-alkylacrylamide, or vinylformamide. More preferably, the nonionic monomer is acrylamide.

The molar ratio of each component of the heterogeneous polymer blend may range from about 1 mol % to about 50 mol % of each monomer. Preferably, the molar reactant ratio is in the range of from about 10 to about 30 mol % anionic monomer, from about 40 to about 80 mol % nonionic monomer, and from about 10 to about 30 mol % cationic monomer.

Depending on the molar ratio of each monomer component present, the final heterogeneous polymer blend may carry a positive or negative charge, or may be essentially isoelectric. Preferably, the molar ratios of the anionic and cationic components are selected such that the heterogeneous polymer blend is essentially isoelectric at a neutral pH. There may be, however, applications where a net anionic or cationic charge is advantageous.

Monomers polymerize linearly unless in the presence of bi-functional compounds. If branched polymers are necessary for a particular application, small concentrations of bi- or multi-functional compound(s) may be added to one or more steps of the polymerization reaction. Preferably, the reaction does not contain bi- or multi-functional compounds and the resulting polymers are substantially linear.

The heterogeneous polymer blend may be used in any form conventionally used in the papermaking industry, including, but not limited to, aqueous suspensions; inverse emulsions and microemulsions; brine dispersions; and dried or precipitated polymer blends that have been ground or powdered. Preferably, the heterogeneous polymer blend is used in a stable aqueous suspension.

The heterogeneous polymer blends may be used to substantially increase the inorganic filler content of paper or paperboard while maintaining the physical properties—including bulk (weight), runnability, and strength—of the resulting product. The increased filler content is advantageous in papermaking because inorganic filler is inexpensive relative to virgin or recycled wood fiber.

The heterogeneous polymer blends can increase the inorganic filler content of paper or paperboard by 10% (based on dry weight) without lowering other physical properties of the final paper product. The present invention may be used with any inorganic filler, including, but not limited to, precipitated calcium carbonate, ground calcium carbonate, kaolin clay, calcined kaolin clay, talc, calcium sulphate, calcium phosphate, and titanium dioxide. Preferably, the inorganic filler is precipitated calcium carbonate, ground calcium carbonate, or kaolin clay. More preferably, the inorganic filler is precipitated calcium carbonate. Most preferably, the inorganic filler is acicular-aragonite precipitated calcium carbonate or clustered scalenohedral calcite precipitated calcium carbonate.

The preferred embodiments of the present invention provided higher finished sheet stiffness levels than other inorganic fillers.

The heterogeneous polymer blends of the present invention may be mixed with the inorganic filler as a filler pre-treatment before final mixture with the pulp slurry or the heterogeneous polymer blends and the inorganic fillers may be added stepwise to the pulp slurry. Preferably, the heterogeneous polymer blend and the inorganic filler are mixed before addition to the pulp slurry. The compounds of the present invention may also be applied in the wet end of the paper machine.

The heterogeneous polymer blend is effective for a wide range of treatment levels. Preferably, the pulp slurry is treated with from about 0.05 to about 1 wt % of the heterogeneous polymer blend relative to the total dry weight of the papermaking furnish (pulp slurry plus additives). More preferably, the pulp slurry is treated with from about 0.1 to about 0.5 wt % of the heterogeneous polymer blend relative to the total dry weight of the papermaking furnish.

The heterogeneous polymer blends may be used in a wide range of final paper products and paper grades, including, but not limited to, uncoated copy paper, coated fine paper, coated mechanical paper, uncoated mechanical paper, and packaging paper.

In addition to maintaining desirable finished paper qualities while increasing the amount of total inorganic filler in the finished paper or paperboard, the present invention has the unexpected benefits of increasing the runnability of pulp slurries with high filler content and providing lubrication for the forming fabrics and stationary dewatering elements of the paper machine. The polymeric blends increase the cohesion of never-dried wet webs containing high filler loadings; this cohesion improves the machine runnability at high filler loadings. Additionally, as the inorganic filler content of pulp slurry increases, the mechanical parts of the paper machine face greater abrasion from the inorganic filler. This abrasion increases maintenance costs and machine downtime, thus reducing productivity. Increased fabric and parts life can reduce the overall cost of paper production and increase machine on-stream time.

Slip agents, such as TEFLON, can be used to decrease the friction experienced by the paper machine, but these agents may have negative impacts on finished paper product quality and are often expensive. The heterogeneous polymer blend of the present invention improved fabric life on paper machines under laboratory tests. Treatment of the pulp slurry with the compound of the present invention will reduce abrasion with treatment levels from about 0.01 to about 10 wt % based on the total dry weight of the filler. A dosage of about 1.5 wt % based on the total dry weight of the filler is preferred. The heterogeneous polymer blend may be applied to reduce abrasion in the same manner as to increase the inorganic filler content of the finished paper or paperboard.

EXAMPLES

The following Examples help to illustrate embodiments of the present invention.

For each of the following examples, weight % refers to the weight % of the active polymer solids and excludes the aqueous solution. For Examples 7-14, which describe methods of using the novel heterogeneous polymer blend to increase the filler content of pulp slurry, all product dosages are expressed as active (solids) material as a percentage of the total dry material being treated (wood fiber plus filler and other additives); water is excluded from the calculation.

Example 1

Synthesis of an In-Situ Heterogeneous Polymer Blend

Samples of the heterogeneous polymer blend were prepared by the following method. Acrylamide, available from SNF, Riceboro, Ga., and DADMAC, available from Kemira, Kennesaw, Ga., were placed in separate flasks and sparged with oxygen-free nitrogen for thirty (30) minutes. 1.10 grams of 10% Copper (II) Sulfate, available from Sigma Aldrich, St. Louis, Mo., was added to the flask containing the sparged acrylamide solution and the flask was monitored to avoid a runaway exothermic reaction.

Separately, a 3,000 mL 4-neck round bottom flask was equipped with a condenser, a mechanical stirrer, a thermocouple attached to a regulator, a nitrogen inlet for sparging, a nitrogen outlet, and a heating mantle. 35.51 g acrylic acid, available from Rohm & Haas, Philadelphia, Pa., was added to the flask. The flask was charged with 1432.53 g of deionized water and sparged with oxygen-free nitrogen for thirty (30) minutes.

In a separate 100 mL round bottom flask, 46.87 g of 10% solution of a,a'-azodiisobutyramidine dihydrochloride (V50), available from Wako, Richmond, Va., was added and stirred at 275 RPM while sparging with oxygen-free nitrogen for thirty (30) minutes. Twenty percent (20%) (9.37 g) of the sparged V50 was added to the acrylic acid. The 3000 mL flask was heated to 55° C. for thirty (30) minutes while stirring at 275 RPM. The temperature was monitored to ensure that there was not a runaway exothermic reaction. An ice bath was kept available to control the temperature.

323.63 g of the sparged acrylamide solution was added to the 3000 mL flask, then an additional 20% (9.37 g) of the sparged V50 was added. The 3000 mL flask was heated to 55° C. for thirty (30) minutes while stirring at 275 RPM. After thirty (30) minutes, the temperature was adjusted to 65° C. and 121.33 g of the sparged DADMAC solution was added. A syringe pump was charged with the remaining V50 solution (28.12 g). Forty percent (40%) of the V50 solution (11.25 g) was added drop-wise over the next 270 minutes while heating and stirring the solution at 275 RPM.

After 270 minutes, the temperature of the 3000 mL flask was increased to 75° C. and the remaining V50 solution (16.87 g) was added drop-wise over the next thirty (30) minutes. After thirty (30) minutes, the temperature of the 3000 mL flask was increased to 80° C. and heated at 80° C. for an additional sixty (60) minutes. The resulting solution was cooled to room temperature. The pH of the solution was measured and adjusted to 7 using sodium hydroxide.

The reaction resulted in a stable, opaque suspension of a heterogeneous polymer blend containing polyacrylamide, sodium polyacrylate, poly-acrylamide/acrylate copolymer, poly-DADMAC, poly-DADMAC/acrylamide copolymer, and a poly-acrylamide/acrylate/DADMAC terpolymer with an active polymer concentration of 10% and a Brookfield viscosity of 3000 cps (measured using a #3 LVT spindle, 30 RPM at 22° C.). The blend fractions were calculated using kinetic sampling and 1H NMR sampling of the in-process composition. The product was also analyzed post-reaction using 13C NMR. The final heterogeneous polymer blend contained the following (as a weight percent of the polymer solids): 13% polyacrylate, 4% poly-acrylamide/acrylate copolymer, 64% polyacrylamide, 6% poly-DADMAC/acrylamide copolymer, 12% poly-DADMAC, and 1% poly-acrylate/acrylamide/DADMAC terpolymer. The heterogeneous polymer blend did not precipitate, gel, or separate when stored at room temperature for thirty (30) days.

Example 2

Synthesis of an In-Situ Heterogeneous Polymer Blend

Samples of the heterogeneous polymer blend were prepared by the following method. Acrylamide, available from Kemira, Kennesaw, Ga., and DADMAC, available from Sigma Aldrich, St. Louis, Mo., were placed in separate flasks and sparged with oxygen-free nitrogen for thirty (30) minutes.

Separately, a 500 mL 4-neck round bottom flask was equipped with a condenser, a mechanical stirrer, a thermocouple attached to a regulator, a nitrogen inlet for sparging, a nitrogen outlet, and a heating mantle. 14.06 g acrylic acid, available from Sigma Aldrich, St. Louis, Mo., was added to the flask. The flask was charged with 205 g of deionized water and sparged with oxygen-free nitrogen for thirty (30) minutes. 0.24 g of isopropanol, available from VWR, West Chester, Pa., was added to the 500 mL flask.

In a separate 50 mL round bottom flask, 11.13 g of 20% solution of a,a'-azodiisobutyramidine dihydrochloride (V50), available from Wako, Richmond, Va., was added and stirred at 275 RPM while sparging with oxygen-free nitrogen for thirty (30) minutes. Twenty percent (20%) (2.23 g) of the sparged V50 was added to the acrylic acid. The 500 mL flask was heated to 45° C. for 45 minutes while stirring at 275 RPM. The temperature was monitored to ensure that there was not a runaway exothermic reaction. An ice bath was available to control the temperature.

54.92 g of the sparged acrylamide solution was added to the 500 mL flask, followed quickly by 40% (4.46 g) of the sparged V50. The 500 mL flask was heated to 45° C. for 45 minutes while stirring at 275 RPM. After 45 minutes, 48.04 g of the sparged DADMAC solution and 20% (2.23 g) of the sparged V50 were added. The 500 mL flask was heated at 45° C. for 45 minutes while stirring at 275 RPM.

After 45 minutes, the temperature of the 500 mL flask was increased to 75° C. and the remaining V50 solution (2.23 g) was added. The mixture was heated at 75° C. for one (1) hour. The resulting solution was cooled to room temperature. The pH of the solution was measured and adjusted to 7 using sodium hydroxide.

The reaction resulted in a stable, opaque suspension of a heterogeneous polymer blend containing polyacrylamide, sodium polyacrylate, poly-acrylamide/acrylate copolymer, poly-DADMAC, poly-DADMAC/acrylamide copolymer, and a poly-acrylamide/acrylate/DADMAC terpolymer with an active polymer concentration of 10.2% and a Brookfield viscosity of 580 cps (measured using a #3 LVT spindle, 30 RPM at 22° C.). The blend fractions were calculated using kinetic sampling and 1H NMR sampling of the in-process composition. The heterogeneous polymer blend did not precipitate, gel, or separate when stored at room temperature for thirty (30) days.

Example 3

Synthesis of an In-Situ Heterogeneous Polymer Blend

Samples of the heterogeneous polymer blend were prepared by the following method. Acrylamide and DADMAC, both available from SNF, Riceboro, Ga., were placed in separate flasks and sparged with oxygen-free nitrogen for thirty (30) minutes.

Separately, a 500 mL 4-neck round bottom flask was equipped with a condenser, a mechanical stirrer, a thermocouple attached to a regulator, a nitrogen inlet for sparging, a nitrogen outlet, and a heating mantle. 14.06 g acrylic acid, available from SNF, Riceboro, Ga., and 205.49 g deionized water were added to the flask and stirred at 275 RPM for 30 minutes while sparging with oxygen-free nitrogen.

In a separate 50 mL round bottom flask, 11.13 g of 20% solution of a,a'-azodiisobutyramidine dihydrochloride (V50), available from Wako, Richmond, Va., was added and stirred at 275 RPM while sparging with oxygen-free nitrogen for thirty (30) minutes. Twenty percent (20%) (2.23 g) of the sparged V50 was added to the acrylic acid. The 500 mL flask was heated to 45° C. for 45 minutes while stirring at 275 RPM. The temperature was monitored to ensure that there was not a runaway exothermic reaction.

54.92 g of the sparged acrylamide solution was added to the 500 mL flask, followed quickly by 40% (4.46 g) of the sparged V50. The 500 mL flask was heated to 45° C. for 45 minutes while stirring at 275 RPM. After 45 minutes, 48.04 g of the sparged DADMAC solution and 20% (2.23 g) of the sparged V50 were added. The 500 mL flask was heated at 45° C. for 45 minutes while stirring at 275 RPM.

After 45 minutes, the temperature of the 500 mL flask was increased to 75° C. and the remaining V50 solution (2.23 g) was added. The mixture was heated at 75° C. for one (1) hour. The resulting solution was cooled to room temperature. The pH of the solution was measured and adjusted to 7 using sodium hydroxide.

The reaction resulted in a stable, opaque suspension of a heterogeneous polymer blend containing polyacrylamide, sodium polyacrylate, poly-acrylamide/acrylate copolymer, poly-DADMAC, poly-DADMAC/acrylamide copolymer, and a poly-acrylamide/acrylate/DADMAC terpolymer with an active polymer concentration of 10.4% and a Brookfield viscosity of 774 cps (measured using a #3 LVT spindle, 30 RPM at 22° C.). The blend fractions were calculated using kinetic sampling and 1H NMR sampling of the in-process composition. The heterogeneous polymer blend did not precipitate, gel, or separate when stored at room temperature for thirty (30) days.

Example 4

Synthesis of a Post-Reaction Polymer Blend

A heterogeneous polymer blend was synthesized using post reaction polymers. First the three polymers were made. To make the polyacrylamide, 219.9 g of acrylamide, available from SNF, Riceboro, Ga., was added to a 2000 mL round bottom flask and diluted with 800 g of deionized water. The mixture was stirred at 275 RPM and sparged with oxygen-free nitrogen for thirty (30) minutes. After thirty (30) minutes, 0.11 g of Copper (II) Sulfate was added. The reactor was heated to 45° C. and 35.6 g of a 10% V50 solution in deionized water was added to the flask. The reaction exothermed to 50° C. and exhibited high viscosity. To reduce viscosity, 400 g of deoxygenated, deionized water was added. After 45 minutes, 17.8 g of 10% V50 solution was added to the flask and the flask was heated to 75° C. for one (1) hour. The polymer's pH was not adjusted. The reaction yielded 1419 g of an 8.0% solids solution of polyacrylamide.

To make the polyacrylic acid, 28.1 g of acrylic acid, available from SNF, Riceboro, Ga., was added to a 1000 mL round bottom flask and diluted with 400 g of deionized water. The mixture was stirred at 275 RPM and sparged with oxygen-free nitrogen for thirty (30) minutes. After thirty (30) minutes, the flask was heated to 45° C. and 17.80 g of a 10% V50 solution in deionized water was added to the flask. The reaction was held at 45° C. (with a slight exotherm to 50° C.) for 45 minutes. The polymer's pH was not adjusted. The reaction yielded 420 g of a clear, 6.9% solids solution of polyacrylic acid.

To make the poly-DADMAC, 121.4 g of DADMAC, available from SNF, Riceboro, Ga., was added to a 1000 mL round bottom flask and diluted with 538 g of deionized water. The mixture was stirred at 275 RPM and sparged with oxygen-free nitrogen for thirty (30) minutes. Next, the reactor was heated to 75° C. and 13.1 g of a 10% V50 solution in deionized water was added to the flask, via syringe pump, over the next 120 minutes. After 120 minutes, an additional 3.3 g aliquot of 10% V50 solution in deionized water was added and the temperature increased to 80° C. and held for 30 minutes. The polymer's pH was not adjusted. The reaction yielded 664 g of a clear, 12.80% solids solution of poly-DADMAC.

After the three polymers were made, the heterogeneous post-reaction polymer blend was made. First, 230 g of polyacrylate (7.0 wt % solids) was slowly mixed into 380 g of the polyacrylamide solution (8.5 wt % solids). The resulting mixture was diluted with 420 g of deionized water and stirred vigorously at 400 RPM. While the mixture was being stirred, 220 g of the poly-DADMAC solution (16.6 wt % solids) was slowly added to the blend. Any precipitated material was redissolved by stepwise addition of a 50% NaOH solution to adjust the pH of the blend to 7.0.

The blend results in a stable, opaque suspension of a heterogeneous blend with an active polymer concentration of 11.7 wt % and a Brookfield viscosity of 1200 cps. The blend is 19 wt % polyacrylate, 38 wt % polyacrylamide, and 43 wt % poly-DADMAC.

Example 5

Synthesis of a Heterogeneous Polymer Blend Containing 4-Styrenesulfonic Acid Sodium Salt Hydrate (SSA), Acrylamide, and Methylacroyl-N-Propyl Trimethyl Ammonium Chloride (MAPTAC)

Samples of a SSA/acrylamide/MAPTAC heterogeneous polymer blend were prepared by the following method. Acrylamide, available from Kemira, Kennesaw, Ga., and MAPTAC, available from Sigma Aldrich, St. Louis, Mo., were placed in separate flasks and sparged with oxygen-free nitrogen for thirty (30) minutes.

Separately, a 500 mL 4-neck round bottom flask was equipped a condenser, a mechanical stirrer, a thermocouple attached to a regulator, a nitrogen inlet for sparging, a nitrogen outlet, and a heating mantle. 133.25 g SSA, available from Sigma Aldrich, St. Louis, Mo., and 23.72 g deionized water were added to the flask and stirred at 275 RPM for 30 minutes. The flask was charged with 242 g of deionized water and stirred at 275 RPM and sparged with oxygen-free nitrogen for thirty (30) minutes.

In a separate 50 mL round bottom flask, 7.45 g of 20% solution of V50, available from Wako, Richmond, Va., was added and stirred at 275 RPM while sparging with oxygen-free nitrogen for thirty (30) minutes, Twenty percent (20%)

(1.49 g) of the sparged V50 was added to the SSA. The 500 mL flask was heated to 45° C. for 45 minutes while stirring at 275 RPM.

36.75 g of the sparged acrylamide solution was added to the 500 mL flask, followed quickly by 40% (2.98 g) of the sparged V50 solution. The 500 mL flask was heated to 50° C. for 45 minutes while stirring at 275 RPM. After 45 minutes, 57.06 g of the sparged MAPTAC solution and 20% (1.49 g) of the sparged V50 were added as quickly as possible. The 500 mL flask was heated at 50° C. for 45 minutes while stirring at 275 RPM.

After 45 minutes, the temperature of the 500 mL flask was increased to 75° C. and the remaining V50 solution (1.49 g) was added. The mixture was heated at 75° C. for one (1) hour. The resulting solution was cooled to room temperature. The pH of the solution was measured and adjusted to 7 using sodium hydroxide.

The reaction resulted in a stable, opaque suspension of a heterogeneous polymer blend with an active polymer concentration of 15.3% and a Brookfield viscosity of 46 cps (measured using a #63 spindle, 50 RPM at 22° C.). Residual SSA and acrylamide monomer was measured and found to be less than 2 ppm. This suspension separated on dilution and required vigorous agitation to obtain a uniform suspension suitable for use in papermaking.

Example 6

Synthesis of a Heterogeneous Polymer Blend Using Reverse Addition Order (as Compared to Example 1)

Samples of the heterogeneous polymer blend were prepared by the following method. 161.9 g of acrylamide, available from SNF, Riceboro, Ga., and 17.76 g of acrylic acid, available from Aldrick, St. Louis, Mo., were placed in separate flasks. The acrylamide was mixed with 716.6 g deionized water and 0.11 g solid Copper (II) Sulfate, available from Sigma Aldrich, St. Louis, Mo. Both flasks were sparged with oxygen-free nitrogen for thirty (30) minutes.

Separately, a 500 mL 4-neck round bottom flask was equipped with a Y connector fitted with a 250 mL dropping funnel and a condenser, a mechanical stirrer, a thermocouple attached to a regulator, a nitrogen inlet for sparging, a nitrogen outlet, and a heating mantle. 60.68 g DADMAC, available from SNF, Riceboro, Ga. were added to the flask and stirred at 275 RPM and sparged with oxygen-free nitrogen for thirty (30) minutes.

In a separate 50 mL round bottom flask, a 10% solution of V50, available from Wako, Richmond, Va., was added and stirred at 275 RPM while sparging with oxygen-free nitrogen for thirty (30) minutes. A syringe pump was charged with 9.38 g of the sparged V50 solution and the solution was injected dropwise into the 500 mL flask over 180 minutes. While the solution was being added to the flask, the temperature was kept constant at 65° C. while stirring at 275 RPM.

The sparged acrylamide solution was added to the 500 mL flask, followed quickly by 4.69 g of the sparged 10% V50 solution. The 500 mL flask was cooled to 50° C. and the temperature was maintained for one (1) hour while stirring at 275 RPM. After one (1) hour, 17.76 g of the acrylic acid and 4.69 g of the V50 solution were quickly added to the flask. The temperature was maintained at 50° C. for one (1) hour while stirring at 275 RPM.

After one (1) hour, the temperature of the 500 mL flask was increased to 75° C. and the remaining 4.69 g of V50 solution was added via syringe pump, dropwise, over thirty (30) minutes. After the V50 solution was completely added, the flask was to 80° C. for one (1) hour. The resulting solution was cooled to room temperature. The pH of the solution was measured and adjusted to 7.4 using sodium hydroxide.

The reaction resulted in a light grey, viscous suspension of a heterogeneous polymer blend with an active polymer concentration of 14.5% and a Brookfield viscosity of 20,100 cps (measured using a #63 spindle, 5 RPM at 22° C.). The blend fractions were calculated using kinetic sampling and 1H NMR sampling of the in-process composition. 1H NMR analysis showed 99.9% conversion of DADMAC into poly-DADMAC and less than 1 ppm unreacted acrylic acid and 253 ppm unreacted acrylamide. The heterogeneous polymer blend did not precipitate, gel, or separate when stored at room temperature for thirty (30) days.

Example 7

Papermaking Utility to Increase the Sheet Ash Content of the Final Paper or Paperboard Product The heterogeneous polymer blend of the present invention as synthesized in Example 2 was used with clustered acicular-aragonite precipitated calcium carbonate filler (ULTRAB-ULK® II PCC), available from Specialty Minerals, Inc., Bethlehem, Pa. The filler had a mean particle diameter of 3.9 microns. Separate runs tested the heterogeneous polymer blend of the present invention as a filler pre-treatment prior to papermaking and as a wet end additive during papermaking with the filler added prior to the heterogeneous polymer blend. For all runs, the polymer was added at a treatment amount equal to 0.45 wt %, based on the total dry paper furnish. Both methods of addition resulted in superior final paper product properties.

The final paper product was made to a sheet ash target of 30 wt % dry weight using a pulp slurry of 70 wt % bleached hardwood and 30 wt % bleached softwood fiber. The fiber stock was refined to a freeness target of 450 mL CSF. Other standard additives (all expressed as wt % of the total dry paper furnish) included 0.75% Stalok 300 starch, available from Tate and Lyle, Decatur, Ill., 0.25% alum, available from General Chemical, Parsippany, N.J., 0.1% Prequel 1000 ASA size, 0.015% PERFORM PC8138 flocculant, and 0.01% PERFORM SP9232 drainage aid, all available from Hercules, Inc., Wilmington, Del. The size press was treated with a surface treatment of 50 lb/T of ETHYLEX 2015 hydroxyethylated corn starch, available from Tate and Lyle, Decatur, Ill., The paper machine was calendered to a top side smoothness target of 150 Sheffield units.

The finished paper product using the present invention was compared to paper made using the same variables and additives, but that used a clustered scalenohedral-calcite filler (SMI ALBACAR® LO PCC), available from Specialty Minerals, Inc., Bethlehem, Pa., with a mean particle diameter of 2.1 microns, a 20 wt % sheet ash target, based on dry weight of the paper furnish, and no heterogeneous polymer blend. The results of the experiment are contained in Table 1. Use of the invention maintained stiffness and strength as filler content increased, when compared to the ALBACAR® LO PCC control at higher filler content, Both filler pretreatment and addition of the copolymer to the pulp furnish helped maintain paper strength at higher filler loading.

a surface treatment of 50 lb/T of ETHYLEX 2015 hydroxyethylated corn starch, available from Tate and Lyle, Decatur, Ill. The paper machine was calendered to a top side smoothness target of 150 Sheffield units. Additionally, the finished paper product made using the present invention was compared to paper made using the same variables and additives, but that used a clustered scalenohedral-calcite filler (SMI

TABLE 1

UTILITY OF THE PRESENT INVENTION AS A FILLER TREATMENT

| | Filler | | | |
|---|---|---|---|---|
| | ALBACAR® LO PCC | ULTRABULK® II PCC | ULTRABULK® II PCC | ALBACAR® LO PCC |
| Chemical Treatment | No | Example 2 - 0.45% | Example 2 - 0.45% | No |
| Application point | None | Wet End | Filler | None |
| Ash (525C) (%) | 20.9 | 29.8 | 29.5 | 31.0 |
| MD Taber Stiffness (gf-cm) | 2.49 | 2.52 | 2.32 | 2.21 |
| CD Taber Stiffness (gf-cm) | 1.11 | 1.06 | 1.01 | 0.91 |
| GM Taber Stiffness (gf-cm) | 1.66 | 1.63 | 1.53 | 1.42 |
| GM Tensile (lbf/in) | 12.61 | 12.19 | 10.81 | 9.87 |
| ZD Tensile (psi) | 75.7 | 71.2 | 72.6 | 67.1 |

Example 8

Comparison of the Heterogeneous Polymer Blend to a Two Component Polymer Blend Addition The heterogeneous polymer blend of the present invention was synthesized as in Example 3 and compared to a post-reaction cationic/anionic polymer blend. The cationic and anionic polymers were derived from the same cationic and anionic monomers used to synthesize the heterogeneous polymer blend of Example 3, and are available as PERFORM PC8229 and HERCOBOND 2000, both available from Hercules, Inc., Wilmington, Del.

A final paper product was made to a sheet ash target of 30 wt % dry weight using a pulp slurry of 70 wt % bleached hardwood and 30 wt % bleached softwood fiber. The fiber stock was refined to a freeness target of 450 mL CSF. Other standard additives (all expressed as wt % of the total dry paper furnish) included 0.75% Stalok 300 starch, available from Tate and Lyle, Decatur, Ill., 0.25% alum, available from General Chemical, Parsippany, N.J., 0.1% Prequel 1000 ASA size, 0.015% PERFORM PC8138 flocculant, and 0.01% PERFORM SP9232 drainage aid, all available from Hercules, Inc., Wilmington, Del. The size press was treated with ALBACAR® LO PCC), available from Specialty Minerals, Inc., Bethlehem, Pa., with a mean particle diameter of 2.1 microns, a 20 wt % sheet ash target, based on dry weight of the paper furnish, and no heterogeneous polymer blend. The results of the run are contained in Table 2.

At a constant top smoothness of 150 Sheffield units, both polymer treatments improved both the in-plane and z-directional tensile properties over the untreated finished paper. The acicular-aragonite precipitated calcium carbonate exhibits some strength advantages compared to the clustered scalenohedral-calcite precipitated calcium carbonate with no polymer added. However, the heterogeneous polymer compound in conjunction with the acicular-aragonite precipitated calcium carbonate filler provided the highest stiffness values and the overall best finished paper qualities.

TABLE 2

COMPARISION OF BLEND PERFORMANCE V. TWO COMPONENT ADDITION

| | Filler | | | | |
|---|---|---|---|---|---|
| | ALBACAR® LO PCC | ALBACAR® LO PCC | ULTRABULK® II PCC | ULTRABULK® II PCC | ULTRABULK® II PCC |
| Chemical Treatment | No | No | Example 3 - 0.45% | Perform® PC8229 - 0.036% Hercobond® 2000 - 0.45% | No |
| Application | None | None | Wet End | Wet End | None |
| Ash (525C) (%) | 19.0 | 28.8 | 28.7 | 27.7 | 31.9 |
| MD Taber Stiffness (gf-cm) | 2.29 | 2.09 | 2.33 | 2.18 | 2.05 |
| CD Taber Stiffness (gf-cm) | 0.85 | 0.79 | 0.96 | 0.79 | 0.83 |
| GM Taber Stiffness (gf-cm) | 1.39 | 1.29 | 1.50 | 1.32 | 1.30 |
| GM Tensile (lbf/in) | 12.51 | 9.07 | 11.06 | 11.08 | 9.45 |
| ZD Tensile (lbf/in) | 75.9 | 56.6 | 64.9 | 74.9 | 62.2 |

Example 9

Comparison of the Present Invention to a Post-Reaction Blend

The heterogeneous polymer blend of the present invention was synthesized as in Example 2 and compared to a post-reaction polymer blend as prepared in Example 4.

A final paper product was made to a sheet ash target of 30 wt % dry weight using a pulp slurry of 70 wt % bleached hardwood and 30 wt % bleached softwood fiber. The fiber stock was refined to a freeness target of 450 mL CSF. Other standard additives (all expressed as wt % of the total thy paper furnish) included 0.75% Stalok 300 starch, available from Tate and Lyle, Decatur, Ill., 0.25% alum, available from General Chemical, Parsippany, N.J., 0.1% Prequel 1000 ASA size, 0.015% PERFORM PC8138 flocculant, and 0.01% PERFORM SP9232 drainage aid, all available from Hercules, Inc., Wilmington, Del. The size press was treated with a surface treatment of 50 lb/T of ETHYLEX 2015 hydroxyethylated corn starch, available from Tate and Lyle, Decatur, Ill. The paper machine was calendered to a top side smoothness target of 150 Sheffield units. Additionally, the finished paper product made using the present invention was compared to paper made using the same variables and additives, but that used a clustered scalenohedral-calcite filler (SMI ALBACAR® LO PCC), available from Specialty Minerals, Inc., Bethlehem, Pa., with a mean particle diameter of 2.1 microns, a 20 wt % sheet ash target, based on dry weight of the paper furnish, and no heterogeneous polymer blend. The results of the run are contained in Table 3.

At a constant top smoothness of 150 Sheffield units, both polymer treatments improved both the in-plane and z-directional tensile properties over the untreated finished paper. However, the heterogeneous polymer compound in conjunction with the acicular-aragonite precipitated calcium carbonate filler provided the highest stiffness values and the overall best finished paper qualities.

Specialty Minerals, Inc., Bethlehem, Pa., was added to the fiber furnish to consist of between 20 and 30 wt %, based on the dry weight of the paper furnish. Additionally, a control sheet using ALBABAR® LO PCC but without the heterogeneous polymer blend was made for comparison purposes. The suspension was diluted with 1 wt % solids, based on the dry weight of the paper furnish. A standard additive package of 0.75% Stalok 300 starch, available from Tate and Lyle, Decatur, Ill., 0.25% alum, available from General Chemical, Parsippany, N.J., 0.02% PERFORM PC8138 flocculant, and 0.02% PERFORM SP7200 drainage aid was added to the furnish (all percentages are based on the dry weight % of the total furnish).

Aliquots of the treated and untreated furnish were used to produce 8×8-inch square handsheets with a target basis weight of 90 lbs/3000 square feet. The sheets were pressed via standard conditions, but were not dried. Each pressed sheet was then sandwiched between two plastic transparency sheets and a paper cutter was used to cut the paper/transparency sheets into 1-inch wide strips. The strips were tested for never-dried wet tensile strength using an Instron-type machine. Separate handsheets from identical test conditions were then dried to evaluate each test condition for solids, basis weight, and retained ash content. These evaluations were done using standard TAPPI methods.

Increasing the retained sheet ash from 17 to 25 wt %, based on the dry weight of the finished paper, in conjunction with the filler type change resulted in a 56% drop in never-dried wet tensile strength with no change in press solids. The addition of 0.2 wt %, based on the dry weight of the paper furnish,

TABLE 3

COMPARISON OF IN-SITU HETEROGENEOUS POLYMER BLEND TO POST-REACTION HOMOPOLYMER BLEND

| | Filler | | |
|---|---|---|---|
| | ALBACAR® LO PCC | ULTRABULK® II PCC | ULTRABULK® II PCC |
| Chemical Treatment | No | Example 2 - 0.45% In-situ blend | Example 4 - 0.45% Post-reaction blend |
| Application Point | None | Wet End | Wet End |
| Ash (525C) (%) | 31.0 | 29.8 | 30.2 |
| MD Taber Stiffness (gf-cm) | 2.21 | 2.52 | 2.37 |
| CD Taber Stiffness (gf-cm) | 0.91 | 1.06 | 1.01 |
| GM Taber Stiffness (gf-cm) | 1.42 | 1.63 | 1.55 |
| GM Tensile (lbf/in) | 9.87 | 12.19 | 11.34 |
| ZD Tensile (psi) | 67.1 | 71.2 | 66.5 |

Example 10

Ability of the Heterogeneous Polymer Blend to Increase or Maintain Paper Machine Runnability The heterogeneous polymer blend was synthesized as in Example one and evaluated on a Noble and Wood handsheet study to evaluate the blend's effect on paper machine runnability. The fiber furnish for the runs consisted of 70 wt % of 360 mL CSF bleached hardwood Kraft blended with 30 wt % 500 mL CSF bleached softwood Kraft. An inorganic calcium carbonate filler of ULTRABULK® II PCC, available from of the heterogeneous polymer blend from Example 1, improved performance over the untreated furnish by 38%. When the paper furnish was treated with 0.4 wt %, based on the dry weight of the paper furnish, it improved performance over the untreated furnish by 65%.

Paper machine runnability is closely related to the cohesiveness of the wet web exiting the press section; the higher cohesiveness, the more "runnable" the furnish. The addition of the heterogeneous polymer blend of the present invention increased the web's cohesiveness, which is expected to translate into improved paper machine runnability at elevated sheet ash content. The results of are provided in Table 4.

TABLE 4

IMPROVEMENT IN WET WEB COHESION

| Condition Units | Ash (525C) (%) | Filler Type | Wet Tensile (lbf/in) | Solids (%) |
|---|---|---|---|---|
| Control | 16.7 | ALBACAR LO ® PCC | 0.92 | 49.9 |
| Control | 25.5 | ULTRABULK ® II PCC | 0.40 | 49.7 |
| 0.2% Example 1 | 25.4 | ULTRABULK ® II PCC | 0.60 | 47.1 |
| 0.4% Example 1 | 24.7 | ULTRABULK ® II PCC | 0.74 | 46.3 |

Example 11

Utility of the Heterogeneous Polymer Blends to Decrease Slurry Abrasiveness The heterogeneous polymer blend of the present invention was synthesized as in Example 1 and evaluated against an untreated filler/slurry mixture, and slurry mixture treated with 1.5 wt %, based on the dry weight of the slurry, of a two component poly-DADMAC/acrylate/acrylamide copolymer. Both ALBACAR® SP PCC and ULTRABULK® II PCC, both available from Specialty Minerals, Inc., Bethlehem, Pa., were used as the inorganic filler for evaluation.

Abrasion potential was evaluated using an Einlehner abrasion tester (model AT2000) to determine how the slurries would cause wear on the synthetic wires of paper machines. The amount of wear caused by the fillers or other additives is determined by the weight loss of a test wire. The test wire loses material as a result of the sliding friction generated by a rotary abrader "test body" in an aqueous suspension of the filler or pigment that is being tested. The weight the test wire loses after completion of a specific distance at a defined pressure level is used to compare the amount of wear caused by the filler or pigment tested.

The test wire is fed around a rotary abrader consisting of ceramic ledges. The rotary abrader is attached to the bottom of the vertical drive shaft and is open at the top. The test wire engages a fixed supporting rod and a supporting rod that pivots around this fixed rod and is pressed against the rotary abrader by a loading weight. The test wire and the rotary abrader are immersed completely in a suspension of the filler or pigment that is in a glass test cylinder. The suspension is able to reach the test wire from the inside through the gaps between the ceramic ledges of the rotary abrader, with the help of the suction created between the wire and the rotary abrader. The suspension is kept thoroughly mixed by the rotary movement of the ceramic ledge abrader. The suspension consistency is chosen so that the weight loss is in target with a reference GCC filler sample with both rotary abraders. The outside of the wire is covered with adhesive tape, so that an adequate film of liquid forms between the ceramic ledges and the wire.

The standard setting for the Einlehner AT2000 abrasion test is 1-kg weight for wire tension, and 25,000 meters distance for rotary abrader movement. The rotary abrader moves at a speed of 333 m/min, so one test takes 75-minutes to complete. The filler samples were tested once with two rotary abraders, and the resulting weight loss (in mg) is an average of these two measurements. The sample amount per test was 9.5 g dry for test body #2062, and 8.5 g dry for test body #2137.

Slurry runs were evaluated for both the ALBACAR® SP PCC and the ULTRABULK® II PCC for the following: untreated slurry, 1.5 wt %, based on the dry weight of the slurry, of the heterogeneous polymer blend, 1.5 wt %, based on the dry weight of the slurry, of the two component compound. While use of the two component polymer only resulted in a slight decrease in slurry abrasiveness, the heterogeneous polymer compound of the present invention resulted in a remarkable decrease in slurry abrasion. The results of the various runs are summarized in Table 5.

TABLE 5

SLURRY ABRASIVITY VIA EINLEHNER ABRASION ANALYSIS

|  | ALBACAR® SP PCC (mg weight loss) | ULTRABULK® II PCC (mg weight loss) |
|---|---|---|
| Untreated Control | 9.0 | 7.0 |
| Example 1 treated (1.5% on filler) | 3.4 | 4.1 |
| Perform® PC8229, Hercobond® 2000 treated (1.5% on filler) | 8.0 | 6.1 |

Example 12

Papermaking Utility of a SSA/AM/MAPTAC Heterogeneous Polymer Blend

The SSA/AM/MAPTAC heterogeneous polymer blend was synthesized as in Example 5 and added to a pulp slurry to evaluate the properties of a final paper product made from the slurry. ALBACAR® LO PCC was used as the inorganic filler. The heterogeneous polymer blend was mixed with the ALBACAR® LO PCC and allowed to stir with low shear at room temperature prior to addition to the slurry.

The final paper product was made as in Example 7 to a sheet ash target of 30 wt % dry weight using a pulp slurry of 70 wt % bleached hardwood and 30 wt % bleached softwood fiber. The fiber stock was refined to a freeness target of 450 mL CSF. Other standard additives (all expressed as wt % of the total dry paper furnish) included 0.75% Stalok 300 starch, available from Tate and Lyle, Decatur, Ill., 0.25% alum, available from General Chemical, Parsippany, N.J., 0.1% Prequel 1000 ASA size, 0.015% PERFORM PC8138 flocculant, and 0.01% PERFORM SP9232 drainage aid, all available from Hercules, Inc., Wilmington, Del. The size press was treated with a surface treatment of 50 lb/T of ETHYLEX 2015 hydroxyethylated corn starch, available from Tate and Lyle, Decatur, Ill. The paper machine was calendered to a top side smoothness target of 150 Sheffield units.

Both polymeric products allowed a higher final ash content in the final paper product, without degradation of strength relative to the 20 wt % ash control sheet. The results of the run are contained in Table 6.

TABLE 6

COMPARISON OF SSA/AM/MAPTAC HETEROGENEOUS POLYMER BLEND PERFORMANCE
TO AN AA/AM/DADMAC HETEROGENEOUS POLYMER BLEND PERFORMANCE

|  | Filler | | | |
| --- | --- | --- | --- | --- |
|  | ALBACAR® LO PCC | ALBACAR® LO PCC | ALBACAR® LO PCC | ALBACAR® LO PCC |
| Chemical Treatment | No | No | Example 3 - 2% relative to PCC solids | Example 5 - 2% relative to PCC solids |
| Application Point | None | None | PCC pre-treatment | PCC pre-treatment |
| Ash (525C) (%) | 21.1 | 30.7 | 26.6 | 26.71 |
| MD Taber Stiffness (gf-cm) | 2.13 | 1.79 | 2.37 | 2.38 |
| CD Taber Stiffness (gf-cm) | 0.79 | 0.69 | 0.72 | 0.76 |
| GM Taber Stiffness (gf-cm) | 1.30 | 1.11 | 1.31 | 1.35 |
| GM Tensile (lbf/in) | 12.18 | 10.29 | 11.43 | 11.89 |
| ZD Tensile (psi) | 99.0 | 72.4 | 90.0 | 92.6 |

Example 13

Comparison of the Heterogeneous Polymer Blend with a Heterogeneous Polymer Blend Synthesized by Reversing Addition Order The heterogeneous polymer blend as synthesized in Example 3 was compared against the heterogeneous polymer blend synthesized by reversing the addition or, as in Example 6 and the efficacy of the two polymer blends was compared, ULTRABULK® II PCC was used as the inorganic filler. Additionally, an untreated ALBACAR® LO PCC control sheet was formed.

The final paper product was made as in Example 7 to a sheet ash target of 30 wt % dry weight using a pulp slurry of 70 wt % bleached hardwood and 30 wt % bleached softwood fiber. The fiber stock was refined to a freeness target of 450 mL CSF. Other standard additives (all expressed as wt % of the total dry paper furnish) included 0.75% Stalok 300 starch, available from Tate and Lyle, Decatur, Ill., 0.25% alum, available from General Chemical, Parsippany, N.J., 0.1% Prequel 1000 ASA size, 0.015% PERFORM PC8138 flocculant, and 0.01% PERFORM SP9232 drainage aid, all available from Hercules, Inc., Wilmington, Del. The size press was treated with a surface treatment of 50 lb/T of ETHYLEX 2015 hydroxyethylated corn starch, available from Tate and Lyle, Decatur, Ill. The paper machine was calendered to a top side smoothness target of 150 Sheffield units.

At a constant smoothness of 150 Sheffield units, the heterogeneous polymer blend as synthesized in Example 3 performed better than the heterogeneous polymer blend synthesized using the reverse addition order. Both blends performed better than the untreated control. The results are summarized in Table 7.

TABLE 7

PERFORMANCE COMPARISON OF HETEROGENEOUS POLYMER
BLENDS MADE IN REVERSE REACTION ORDER

|  | Filler | | | |
| --- | --- | --- | --- | --- |
|  | ALBACAR® LO PCC | ALBACAR® LO PCC | ULTRABULK® II PCC | ULTRABULK® II PCC |
| Chemical Treatment | No | No | Example 6 0.45% | Example 3 0.45% |
| Application Point | None | None | Wet End | Wet End |
| Ash (525C) (%) | 20.0 | 28.9 | 29.5 | 29.1 |
| MD Taber Stiffness (gf-cm) | 2.39 | 1.92 | 1.94 | 1.90 |
| CD Taber Stiffness (gf-cm) | 1.03 | 0.81 | 0.85 | 0.88 |
| GM Taber Stiffness (gf-cm) | 1.56 | 1.25 | 1.28 | 1.29 |
| GM Tensile (lbf/in) | 11.64 | 8.92 | 9.60 | 10.39 |
| ZD Tensile (psi) | 80.8 | 67.9 | 75.7 | 85.0 |

Example 14

Papermaking Utility as a Comparison of ALBACAR® SP-3 and ULTRABULK® II Precipitated Calcium Carbonates Used with the Heterogeneous Polymer Blend The heterogeneous polymer blend of the present invention was synthesized as in Example 6 and the properties of a final paper product were evaluated using two different precipitated calcium carbonate fillers—a acicular-aragonite precipitated calcium carbonate (ULTRABULK® II PCC) and a clustered scalenohedral precipitated calcium carbonate (ALBACAR® SP-3), both available from Specialty Minerals, Inc., Bethlehem, Pa., Wilmington, Del. The two fillers had mean particle diameters of 3.9 and 3.0 microns, respectively. Paper made from pulp slurry containing only the inorganic filler was used as a control.

The final paper product was made as in Example 7 to a sheet ash target of 30 wt % dry weight using a pulp slurry of 70 wt % bleached hardwood and 30 wt % bleached softwood fiber. The fiber stock was refined to a freeness target of 450 mL CSF. Other standard additives (all expressed as wt % of the total dry paper furnish) included 0.75% Stalok 300 starch, available from Tate and Lyle, Decatur, Ill., 0.25% alum, available from General Chemical, Parsippany, N.J., 0.1% Prequel 1000 ASA size, 0.015% PERFORM PC8138 flocculant, and 0.01% PERFORM SP9232 drainage aid, all available from Hercules, Inc., Wilmington, Del. The size press was treated with a surface treatment of 50 lb/T of ETHYLEX 2015 hydroxyethylated corn starch, available from Tate and Lyle, Decatur, Ill. The paper machine was calendered to a top side smoothness target of 150 Sheffield units. The results of the run are contained in Table 8 (ALBACAR®) and Table 9 (ULTRABULK®).

At a constant top smoothness of 150 Sheffield units, final paper made from pulp slurry containing the ULTRABULK® II PCC or ALBACAR SP-3 PCC treated with the heterogeneous polymer mixture performed better than untreated paper.

TABLE 8

PERFORMANCE COMPARISON OF THE HETEROGENEOUS POLYMER BLEND WITH ALBACAR ® SP-3, AND UNTREATED FINISHED PAPER

| | Filler | | | | |
|---|---|---|---|---|---|
| | ALBACAR ® LO PCC | ALBACAR ® LO PCC | ALBACAR ® SP-3 PCC | ALBACAR ® SP-3 PCC | ALBACAR ® SP-3 PCC |
| Chemical Treatment | No | No | No | Example 3 0.33% | Example 3 0.50% |
| Application Point | None | None | None | Wet End | Wet End |
| Ash (525C) (%) | 21.0 | 29.6 | 30.4 | 29.1 | 30.1 |
| MD Taber Stiffness (gf-cm) | 1.99 | 1.60 | 1.54 | 1.65 | 1.68 |
| CD Taber Stiffness (gf-cm) | 0.81 | 0.58 | 0.65 | 0.67 | 0.71 |
| GM Taber Stiffness (gf-cm) | 1.27 | 0.97 | 1.00 | 1.05 | 1.09 |
| GM Tensile (lbf/in) | 9.24 | 7.26 | 7.27 | 7.89 | 8.02 |
| ZD Tensile (psi) | 73.2 | 61.1 | 63.0 | 69.6 | 69.2 |

TABLE 9

PERFORMANCE COMPARISON OF THE HETEROGENEOUS POLYMER BLEND WITH ULTRABULK ® II, AND UNTREATED FINISHED PAPER

| | Filler | | |
|---|---|---|---|
| | ULTRABULK ® II PCC | ULTRABULK ® II PCC | ULTRABULK ® II PCC |
| Chemical Treatment | No | Example 3 0.33% | Example 3 0.50% |
| Application Point | None | Wet End | Wet End |
| Ash (525C) (%) | 31.0 | 29.5 | 28.7 |
| MD Taber Stiffness (gf-cm) | 1.69 | 1.67 | 1.70 |
| CD Taber Stiffness (gf-cm) | 0.61 | 0.76 | 0.79 |
| GM Taber Stiffness (gf-cm) | 1.02 | 1.13 | 1.16 |
| GM Tensile (lbf/in) | 8.02 | 8.50 | 8.72 |
| ZD Tensile (psi) | 69.6 | 68.6 | 72.8 |

It will be appreciated by those skilled in the art that changes could be made to the embodiments and examples described above without departing from the broad inventive concept thereof. It is understood, therefore, that this invention is not limited to the particular embodiments and examples disclosed, but is instead intended to cover modifications within the spirit and scope of the present invention as defined by the appended claims.

What is claimed is:

1. A method of increasing the filler content of a sheet of paper or paperboard, comprising:
   (a) combining a heterogeneous polymer blend, comprising:
      (i) one or more anionic polymers formed from monomers selected from the group consisting of: (1) acrylic acid, (2) methacrylic acid, (3) styrenesulfonic acid, (4) vinylsulfonic acid, (5) acrylamidomethylpropane sulfonic acid, and (6) mixtures thereof; and
      (ii) one or more cationic polymers formed from monomers selected from the group consisting of: (1) diallyldimethylammonium chloride, (2) acryloylethyltrimethyl ammonium chloride (3) methacryloylethyl trimethyl ammonium chloride, (4) acryloylethyltrimethylammonium sulfate (5) methacryloylethyl trimethyl ammonium sulfate, (6) acrylamidopropyltrimethyl ammonium chloride, (7) methacrylamidopropyl trimethyl ammonium chloride, (8) non-quaternized forms of (2)-(7), (9) vinylformamide (subsequently hydrolyzed to vinylamine), and (10) mixtures thereof; and (iii) one or more non-ionic polymers formed from monomers selected from the group consisting of: (1) acrylamide, (2) methacrylamide, (3) N-alkylacrylamide, (4) vinylformamide, and (5) mixtures thereof;

with a precipitated calcium carbonate filler to form a mixture;

(b) combining the mixture with a pulp slurry; and (c) processing the resulting pulp slurry mixture to form a sheet of paper or paperboard.

2. The method of claim 1 wherein the precipitated calcium carbonate filler is selected from the group consisting of: (1) clustered acicular-aragonite crystals, (2) clustered scalenohedral-calcite crystals, or (3) mixtures thereof.

3. The method of claim 1 wherein the precipitated calcium carbonate filler has a mean particle diameter from about 2 microns to about 4 microns.

4. A method of increasing the filler content of a sheet of paper or paperboard, comprising (a) combining either (i) a heterogeneous polymer blend, comprising:

(I) one or more anionic polymers formed from monomers selected from the group consisting of: (1) acrylic acid, (2) methacrylic acid, (3) styrenesulfonic acid, (4) vinylsulfonic acid, (5) acrylamidomethylpropane sulfonic acid, and (6) mixtures thereof; and (II) one or more cationic polymers formed from monomers selected from the group consisting of: (1) diallyldimethylammonium chloride, (2) acryloylethyltrimethyl ammonium chloride (3) methacryloylethyl trimethyl ammonium chloride, (4) acryloylethyltrimethylammonium sulfate (5) methacryloylethyl trimethyl ammonium sulfate, (6) acrylamidopropyltrimethyl ammonium chloride, (7) methacrylamidopropyl trimethyl ammonium chloride, (8) non-quaternized forms of (2)-(7), (9) vinylformamide (subsequently hydrolyzed to vinylamine), and (10) mixtures thereof; and (III) one or more non-ionic polymers formed from monomers selected from the group consisting of: (1) acrylamide, (2) methacrylamide, (3) N-alkylacrylamide, (4) vinylformamide, and (5) mixtures thereof;

or (ii) a precipitated calcium carbonate filler with a pulp slurry to form a mixture;

(b) combining the remaining component (i) or (ii) from step (a) with the pulp slurry mixture; and (c) processing the resulting pulp slurry mixture to form a sheet of paper or paperboard.

5. The method of claim 4 wherein the precipitated calcium carbonate filler is selected from the group consisting of: (1) clustered acicular-aragonite crystals, (2) clustered scalenohedral-calcite crystals, and (3) mixtures thereof.

6. The method of claim 4 wherein the precipitated calcium carbonate filler has a mean particle diameter from about 2 microns to about 4 microns.

7. A method of increasing the filler content of a sheet of paper or paperboard, comprising:

(a) combining a heterogeneous polymer blend, comprising:

(i) one or more anionic polymers formed from monomers selected from the group consisting of: (1) acrylic acid, (2) methacrylic acid, (3) styrenesulfonic acid, (4) vinylsulfonic acid, (5) acrylamidomethylpropane sulfonic acid, and (6) mixtures thereof; and (ii) one or more cationic polymers formed from monomers selected from the group consisting of: (1) diallyldimethylammonium chloride, (2) acryloylethyltrimethyl ammonium chloride (3) methacryloylethyl trimethyl ammonium chloride, (4) acryloylethyltrimethylammonium sulfate (5) methacryloylethyl trimethyl ammonium sulfate, (6) acrylamidopropyltrimethyl ammonium chloride, (7) methacrylamidopropyl trimethyl ammonium chloride, (8) non-quaternized forms of (2)-(7), (9) vinylformamide (subsequently hydrolyzed to vinylamine), and (10) mixtures thereof; and (iii) one or more non-ionic polymers formed from monomers selected from the group consisting of: (1) acrylamide, (2) methacrylamide, (3) N-alkylacrylamide, (4) vinylformamide, and (5) mixtures thereof; and (iv) one or more copolymers comprising at least one anionic monomer and at least one non-ionic monomer; and (v) one or more copolymers comprising at least one cationic monomer and at least one non-ionic monomer;

with a precipitated calcium carbonate filler to form a mixture;

(b) combining the mixture with a pulp slurry; and (c) processing the resulting pulp slurry mixture to form a sheet of paper or paperboard.

8. The method of claim 7 wherein the precipitated calcium carbonate filler is selected from the group consisting of: (1) clustered acicular-aragonite crystals, (2) clustered scalenohedral-calcite crystals, or (3) mixtures thereof.

9. The method of claim 7 wherein the precipitated calcium carbonate filler has a mean particle diameter from about 2 microns to about 4 microns.

10. A method of increasing the filler content of a sheet of paper or paperboard, comprising (a) combining either (i) a heterogeneous polymer blend, comprising:

(I) one or more anionic polymers formed from monomers selected from the group consisting of: (1) acrylic acid, (2) methacrylic acid, (3) styrenesulfonic acid, (4) vinylsulfonic acid, (5) acrylamidomethylpropane sulfonic acid, and (6) mixtures thereof; and (II) one or more cationic polymers formed from monomers selected from the group consisting of: (1) diallyldimethylammonium chloride, (2) acryloylethyltrimethyl ammonium chloride (3) methacryloylethyl trimethyl ammonium chloride, (4) acryloylethyltrimethylammonium sulfate (5) methacryloylethyl trimethyl ammonium sulfate, (6) acrylamidopropyltrimethyl ammonium chloride, (7) methacrylamidopropyl trimethyl ammonium chloride, (8) non-quaternized forms of (2)-(7), (9) vinylformamide (subsequently hydrolyzed to vinylamine), and (10) mixtures thereof; and (III) one or more non-ionic polymers formed from monomers selected from the group consisting of: (1) acrylamide, (2) methacrylamide, (3) N-alkylacrylamide, (4) vinylformamide, and (5) mixtures thereof; and (IV) one or more copolymers comprising at least one anionic monomer and at least one non-ionic monomer; and (V) one or more copolymers comprising at least one cationic monomer and at least one non-ionic monomer;

or (ii) a precipitated calcium carbonate filler with a pulp slurry to form a mixture;

(b) combining the remaining component (i) or (ii) from step (a) with the pulp slurry mixture; and (c) processing the resulting pulp slurry mixture to form a sheet of paper or paperboard.

11. The method of claim 10 wherein the precipitated calcium carbonate filler is selected from the group consisting of: (1) clustered acicular-aragonite crystals, (2) clustered scalenohedral-calcite crystals, and (3) mixtures thereof.

12. The method of claim 10 wherein the precipitated calcium carbonate filler has a mean particle diameter from about 2 microns to about 4 microns.

13. A method of increasing the filler content of a sheet of paper or paperboard by:

(a) combining a poly-diallyldimethylammonium chloride and acrylamide/acrylate copolymer mixture with a precipitated calcium carbonate filler;

(b) combining the resulting mixture from step (a) with a pulp slurry; and (c) processing the resulting pulp slurry mixture to form a sheet of paper or paperboard.

14. The method of claim 13 wherein the precipitated calcium carbonate filler is selected from the group consisting of; (1) clustered acicular-aragonite crystals, (2) clustered scalenohedral-calcite crystals, and (3) mixtures thereof.

15. The method of claim 13 wherein the precipitated calcium carbonate filler has a mean particle diameter from about 2 microns to about 4 microns.

\* \* \* \* \*